(12) United States Patent
Smith et al.

(10) Patent No.: US 8,113,340 B1
(45) Date of Patent: Feb. 14, 2012

(54) MODULAR CONVEYER BELT

(75) Inventors: Marshall D. Smith, Austin, MN (US);
Steven R. Johnson, Hayward, MN (US)

(73) Assignee: Hormel Foods Corporation, Austin, MN (US)

( * ) Notice: Subject to any disclaimer, the term of this patent is extended or adjusted under 35 U.S.C. 154(b) by 202 days.

(21) Appl. No.: 12/613,061

(22) Filed: Nov. 5, 2009

Related U.S. Application Data (60) Provisional application No. 61/149,432, filed on Feb. 3, 2009.

(51) Int. Cl.
*B65G 17/38* (2006.01)
(52) U.S. Cl. ........................................ 198/853; 198/850
(58) Field of Classification Search ........... 198/850–853
See application file for complete search history.

(56) References Cited

U.S. PATENT DOCUMENTS

| | | | |
|---|---|---|---|
| 4,676,368 A | 6/1987 | Damkjär | |
| 4,865,183 A | 9/1989 | Hodlewsky et al. | |
| 5,020,656 A | 6/1991 | Faulkner | |
| 5,174,438 A * | 12/1992 | Witham et al. | 198/851 |
| 5,706,934 A | 1/1998 | Palmaer et al. | |
| 5,826,705 A | 10/1998 | Ramsey et al. | |
| 6,073,756 A | 6/2000 | Damkjær et al. | |
| 6,213,292 B1 | 4/2001 | Takahashi et al. | |
| 6,216,854 B1 | 4/2001 | Damkjær et al. | |
| 6,237,750 B1 | 5/2001 | Damkjaer et al. | |
| 6,332,531 B1 | 12/2001 | Damkjaer | |
| 6,345,715 B2 | 2/2002 | Palmaer | |
| 6,390,288 B1 | 5/2002 | Damkjaer | |
| 6,412,625 B2 | 7/2002 | Damkjaer | |
| 6,467,610 B1 | 10/2002 | MacLachlan | |
| 6,581,758 B1 | 6/2003 | van-Zijderveld et al. | |
| 6,662,938 B2 | 12/2003 | Damkjaer | |
| 6,725,883 B2 | 4/2004 | Guldenfels | |
| 6,758,329 B1 | 7/2004 | Damkjær et al. | |
| 6,857,516 B1 * | 2/2005 | Verdigets | 198/850 |
| 6,918,486 B2 | 7/2005 | Shibayama et al. | |
| D509,038 S | 8/2005 | Damkjaer | |
| 7,314,132 B2 | 1/2008 | Layne et al. | |
| RE40,248 E | 4/2008 | Damkjaer et al. | |
| 7,364,038 B2 | 4/2008 | Damkjaer | |
| 7,559,422 B2 | 7/2009 | Layne et al. | |
| 7,563,188 B2 | 7/2009 | Ozaki et al. | |

(Continued)

OTHER PUBLICATIONS

Intralox Conveyor Belting Engineering Manual, "series 2000" and "series 2400", L-21951-IN, English, 2006, pp. 193 and 213.

(Continued)

*Primary Examiner* — James R Bidwell
(74) *Attorney, Agent, or Firm* — IPLM Group, P.A.

(57) ABSTRACT

A modular member for a conveyer belt is provided that includes an elongated main base, at least one attaching rod and a plurality of hooks. The at least one attaching rod is coupled proximate a first side of the main base. The plurality of aligned hooks are coupled proximate a second side of the main base. Each hook includes a slot defined by an inner surface. The slot of each hook is configured to receive an attaching rod of another modular member. The inner surface that defines the slot of at least one hook has an attaching rod relief cutout section. The attaching rod relief cutout section limits wear between the attaching rod of another modular member that is received in the slot of the at least one hook and the inner surface of the slot of the at least one hook.

22 Claims, 12 Drawing Sheets

U.S. PATENT DOCUMENTS

| | | | |
|---|---|---|---|
| 2001/0042677 A1 | 11/2001 | Palmaer | |
| 2004/0149548 A1 | 8/2004 | Shibayama et al. | |
| 2005/0241924 A1 | 11/2005 | Damkjaer | |
| 2007/0181409 A1 | 8/2007 | Damkjaer | |
| 2008/0000759 A1 | 1/2008 | Krisl | |
| 2008/0067040 A1* | 3/2008 | Gundlach | 198/853 |
| 2008/0105519 A1 | 5/2008 | Harrison | |
| 2008/0164128 A1* | 7/2008 | Ririe | 198/853 |

OTHER PUBLICATIONS

Intralox Modular Plastic Conveyor Belts, "series 2000" and "series 2400", 20194-IN, U.S. English, 2004, pp. 30-32.

Uni chains®. "Uni Flex ONE", known of prior to filing of U.S. Appl. No. 12/613,061.

Uni chains®. "uni M-PNB M1", uni-chains A/S [012070/0307], 2007.

Uni chains®. "uni M-PNB M1", Plastic Modular Belt Catalog. 2008, pp. 24-26.

Uni chains®. "uni Flex ONE", Plastic Modular Belt Catalog. 2008, pp. 133-135.

Uni chains®. Uni Flex ONE. "Snap Link®-Modules simply snap together (Pinless Belt Design) for easy maintenance and cleaning", 2009, Ammeraal Beltech Modular [013571/0709].3

* cited by examiner

MODULAR CONVEYER BELT

CROSS-REFERENCE TO RELATED APPLICATIONS

This application claims priority to U.S. Provisional Application Ser. No. 61/149,432, titled "Modular Belting," filed on Feb. 3, 2009, which is incorporated in its entirety herein by reference.

BACKGROUND

It is common in industries to move a product from one location to another with the use of a conveyer belt system. These types of systems are efficient in moving products. Maintaining the conveyer belts cleanliness, however, can be an issue. This especially becomes an issue when the product to be moved is a food product and the conveyer belt needs to be maintained in a sanitary condition.

For the reasons stated above and for other reasons stated below which will become apparent to those skilled in the art upon reading and understanding the present specification, there is a need in the art for an improved conveyer belt that is able to be cleaned in a fast and efficient manner.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a modular member for a conveyer belt is provided. The modular member includes an elongated main base, at least one attaching rod and a plurality of hooks. The elongated main base has a first side and second side opposite the first side. The at least one attaching rod is coupled proximate the first side of the main base. The plurality of aligned hooks are coupled proximate the second side of the main base. Each hook includes a slot defined by an inner surface. The slot of each hook is configured to receive an attaching rod of another modular member. The inner surface that defines the slot of at least one hook has an attaching rod relief cutout section. The attaching rod relief cutout section limits wear between the attaching rod of another modular member that is received in the slot of the at least one hook and the inner surface of the slot of the at least one hook.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a modular belt that cleans in a relatively easy fashion. In particular, embodiments of the present invention reduce areas of the belt that would obstruct access of a cleaning solution that is sprayed on to the belt and reduces contact surfaces that need to be cleaned. Moreover, embodiments provide a method of reducing wear between connections of modular elements to increase the life of the belt. Further embodiments provide a relatively easy way to connect and disconnect modular elements.

Figure 1:
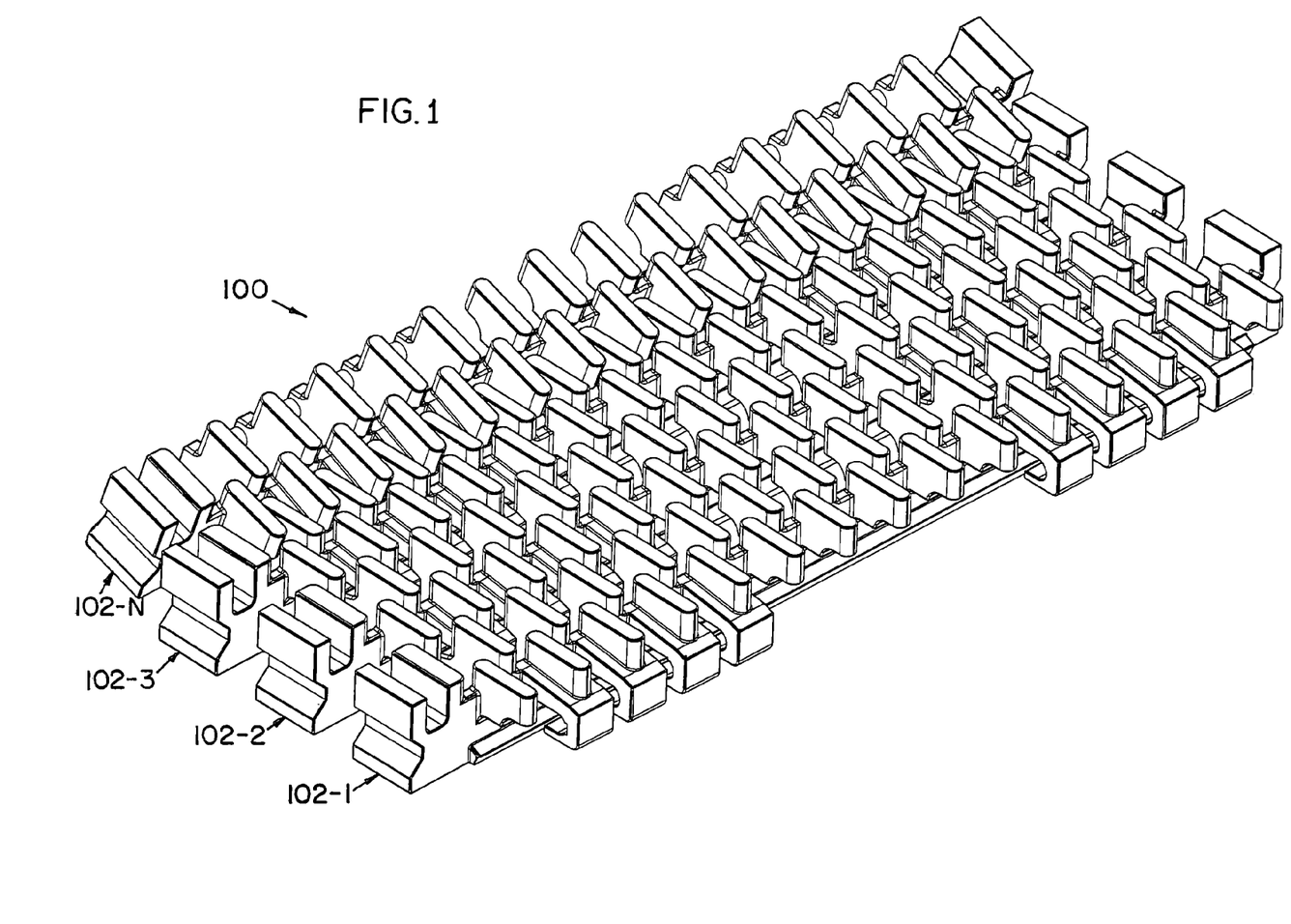
FIG. 1 is a side perspective view of a portion of a modular belt of one embodiment of the present invention.
Figure 2:
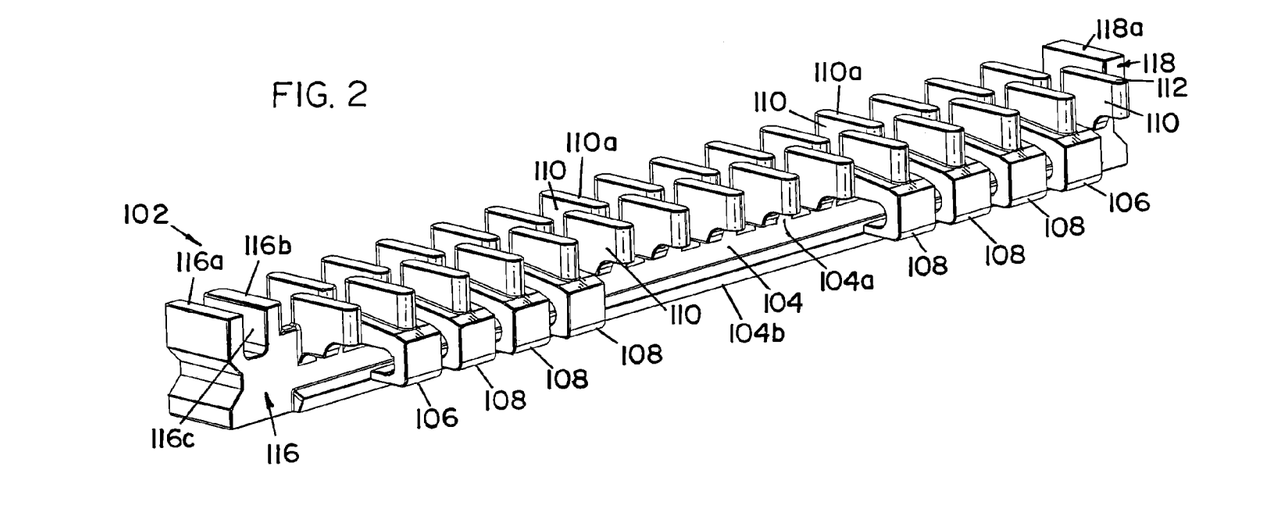
FIG. 2 is a front perspective view of a modular element of one embodiment of the present invention.

Referring to FIG. 1, a side perspective view of a portion of a modular conveyer belt 100 of one embodiment is illustrated. The modular belt 100 is made up of a plurality of modular members 102-1 through 102-N that form the desired length of the modular belt 100. Also, desired widths of the modular belt 100 can be achieved by forming the modular members 102-1 through 102-N of a desired width and also by assembling modular members in a staggered fashion (brick-like pattern). As stated above, only a portion of modular belt 100 is illustrated. It will be understood that a typical complete belt would form a continuous loop that would typically travel in a curvilinear track or the like. An example of a modular element generally designated as 102 is illustrated in FIG. 2. In the front perspective view of FIG. 2 it is illustrated that the modular member 102 includes an elongated main base 104 that extends a length of the modular element 102. The main base 104 is illustrated as having a first edge 104a and a second edge 104b that is opposite the first edge. A plurality of carrying segments 110 are coupled to the main base 104. In particular, in this embodiment the carrying segments 110 extend from the first edge 104a of the main base 104. Referring to the top view of the modular member 102 in FIG. 3, the carrying segments 110 extends out on opposite sides 104c and 104d of the main base 104. The carrying segments 110 include engaging surfaces 110a that form a planar transport surface. The engaging surfaces 110a of the carrying segments 110 engages products placed on the modular belt 100 to move the product as the modular elements 102 move. The modular element 102 further includes a first end member 116 and a second end member 118. The first end member 116 has a first top surface 116a and a second top surface 116b that are both planar with the engaging surfaces 110a of the carrying segments 110. Formed between the top surfaces 116a and 116b of the first end member 116 is a channel 116c. The second end member 118 includes a top surface 118a that is also planar with the engaging surfaces 110a of the carrying segments 110.

Figure 3:
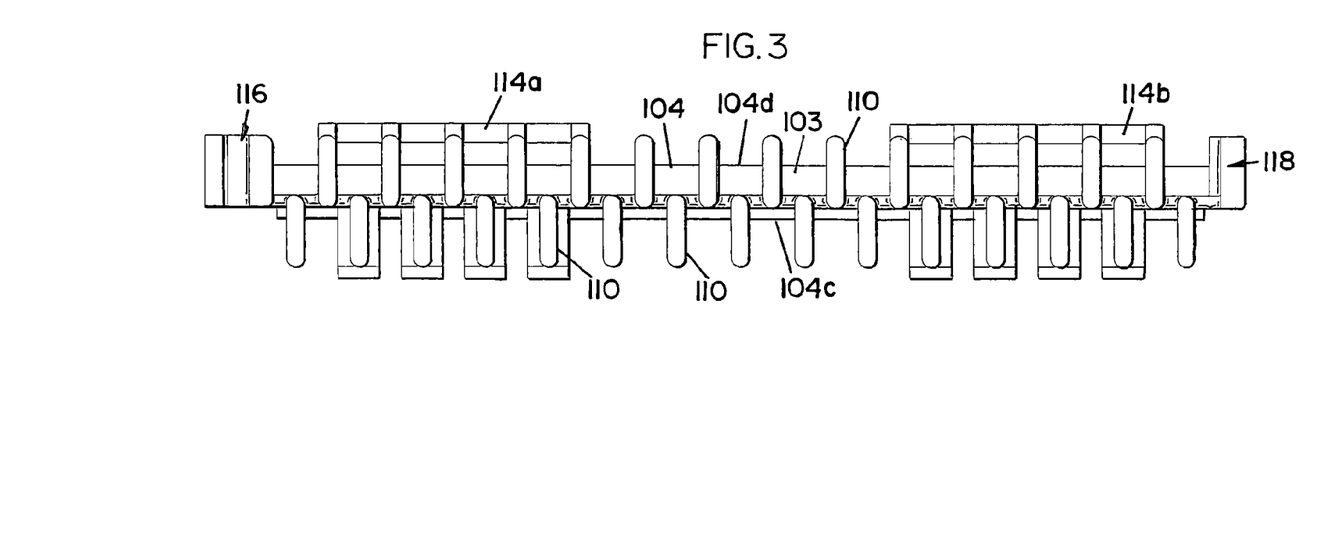
FIG. 3 is a top view of the modular element of FIG. 2.
Figure 4:
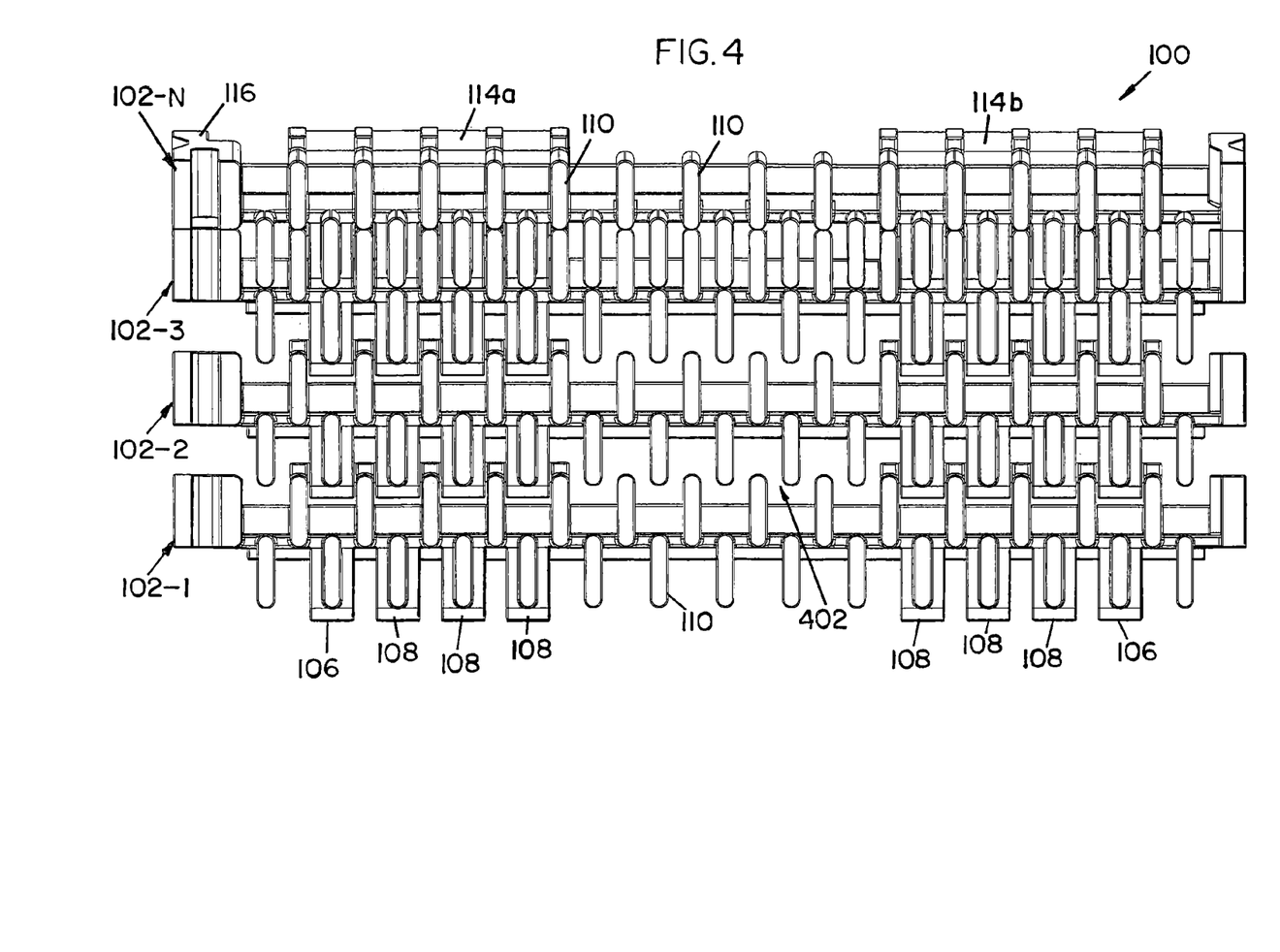
FIG. 4 is a top of the portion of the modular belt of FIG. 1.

As illustrated in FIGS. 2 and 3, some of the carrying segments 110 extending out the first side 104c of the main base 104 have hooks 106 and 108 coupled thereto. In particular, in this embodiment, the hooks include outer hooks 106 and inner hooks 108 that are positioned between the outer hooks 106. Further in this embodiment, some of the carrying segments 110, proximate a mid portion 103 of the main base 104, do not have associated inner hooks 108. Hence, in this embodiment, a select space between the inner hooks is achieved. Referring to FIG. 3, the some of the carrying segments 110 that extend out from the second side 104d of the main base 104 have attaching rods 114a and 114b coupled thereto. As illustrated in this embodiment, two attaching rods 114a and 114b are used that are spaced a select distance from each other. The hooks 106 and 108 of modular member 102 are configured to engage attaching rods 114a and 114b of another modular member 102 and so on to form the modular belt 100. The top view of the modular belt 100 of FIG. 4 illustrates coupled modular members 102-1 through 102-N. As FIG. 4 illustrates the mid sections of the engaging members 102-1 through 102-N without hooks 106, and 108 and the attaching rods 114a and 114b creates an inner section 402 of the modular belt 100. Without attaching rods 114a and 114b and hooks 108 in the inner section 402 of the modular belt 100, the inner section of the modular belt 100 is easier to clean because elements of the modular belt 100 are spaced apart from each other thereby allowing cleaning solution to easily access surface areas of the modular belt 100.

Figure 5A:
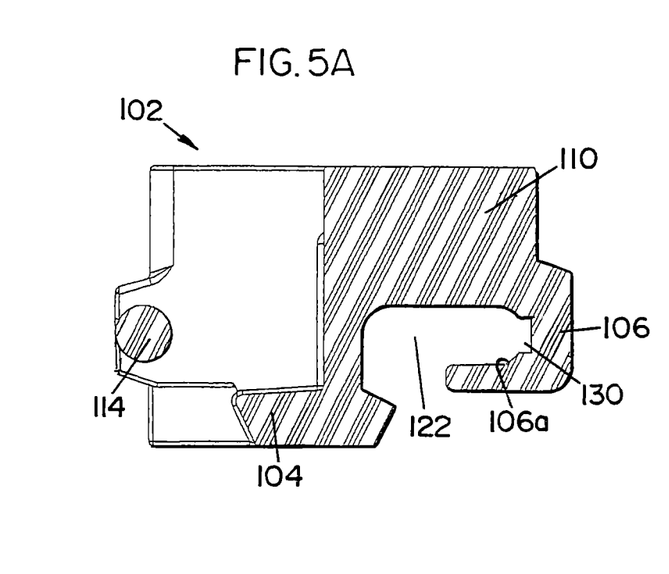
FIG. 5A is a cross-sectional side view of a modular element illustrating a hook portion of one embodiment.
Figure 5B:
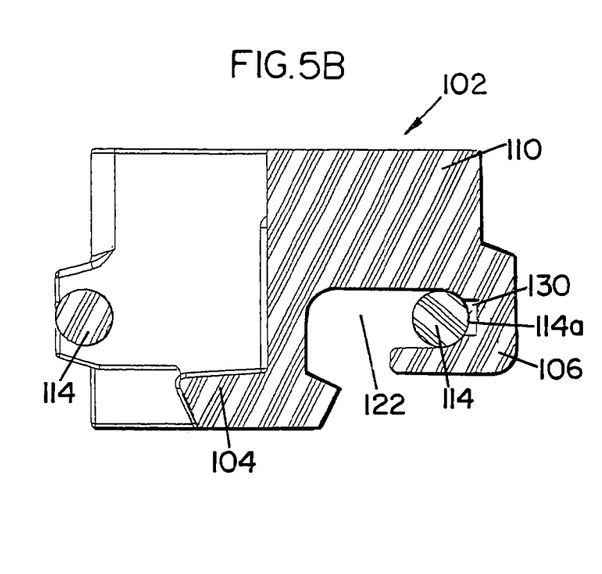
FIG. 5B is a cross-sectional side view of hook portion of the modular element of FIG. 5A engaged with an attaching rod of one embodiment of the present invention.
Figure 13:
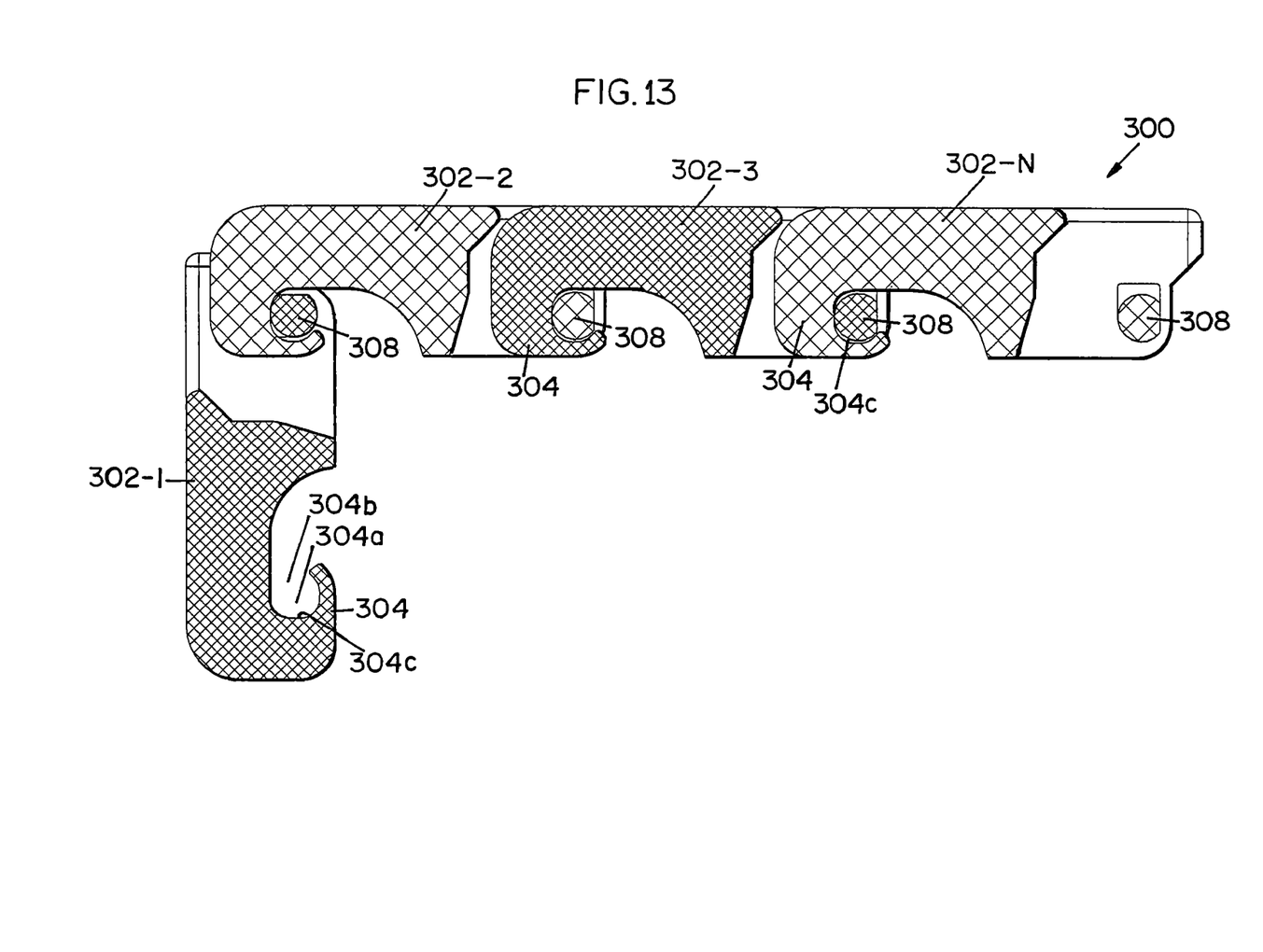
FIG. 13 is a cross-sectional side view of a plurality of modular members coupled together by respective hooks and attaching rods of one embodiment of the present invention.

Referring to 5A, a cross-sectional side view of a modular member 102 illustrating an outer hook 106 is provided. As illustrated, the hook 106 includes a slot 122 that is sized and configured to receive and retain an associated attaching rod 114 of another modular member 102. The hook has an inner surface 106a that defines the slot 122. The inner surface 106a of the hook 106 has an engaging pin relief cutout section 130. In FIG. 5B, the cross-sectional side view of the modular member 102 of FIG. 5A is illustrated having an attaching rod 114 of another modular member 102 received in slot 122. In use, the attaching pin 114 of a first modular member 102 pulls on an inner surface of inner hooks 108 of a second modular member 102 as the modular belt 100 moves along. The outer hooks 106 of this embodiment include the attaching pin relief 130 as illustrated in FIGS. 5A and 5B. The force of an outer surface 114a of the attaching rod 114 on the inner surface 106a of the hook 106 that leads to wear is removed by the attaching pin relief 130 in the outer hooks 106. Hence, wear between attaching rods 114 and the inner surface 106a of the outer hook 106 are reduced if not eliminated by the attaching pin relief 103. Referring to FIG. 2 further explanation of this aspect is provided. As modular member 102 illustrates in FIG. 2, the hooks include outer hooks 106 and inner hooks 108. In one embodiment, only the outer hooks 106 have the attaching pin reliefs 130. The inner hooks 108 without attaching pin reliefs 130 have inner surfaces that engage respective attaching pins in their respective slots to move the modular elements 102 along with respect to each other. Hence, the inner surface of the inner hooks 108 and surface areas of the respective attaching rods engaged with the inner surfaces of the inner hooks 108 wear. An example, of this is illustrated in FIG. 13, where a cross-sectional view of another embodiment adjacent modular members 302-1 through 302-N is illustrated. In this example embodiment, an outer surface 308a of an attaching rod 308 of a first modular member 302-3 in a slot 304a of an adjacent second modular member 302-N is engaged with an inner surface 304c of the hook 304 of the second modular member 302-N. This engagement of the inner surface 310 of the hook 304 and the outer surface 308a of the attaching rod 308 results in wear in the outer surface 308a of the attaching rod 308 and the inner surface 304a of the hook 304. To prevent this type of wear from causing adjacent modular members from coming apart, surface areas of the attaching rods adjacent the attaching pin reliefs 130 of the outer hooks 106 do not wear down since surface areas of the attaching rods adjacent the attaching pin reliefs 103 are not engaging with the inner surface 106a of the hooks 106 as illustrated in FIG. 5B. This embodiment prevents connections between adjacent modular elements 102 from prematurely wearing down and causing the connections between the adjacent modular members 102 from separating inadvertently.

Figure 6:
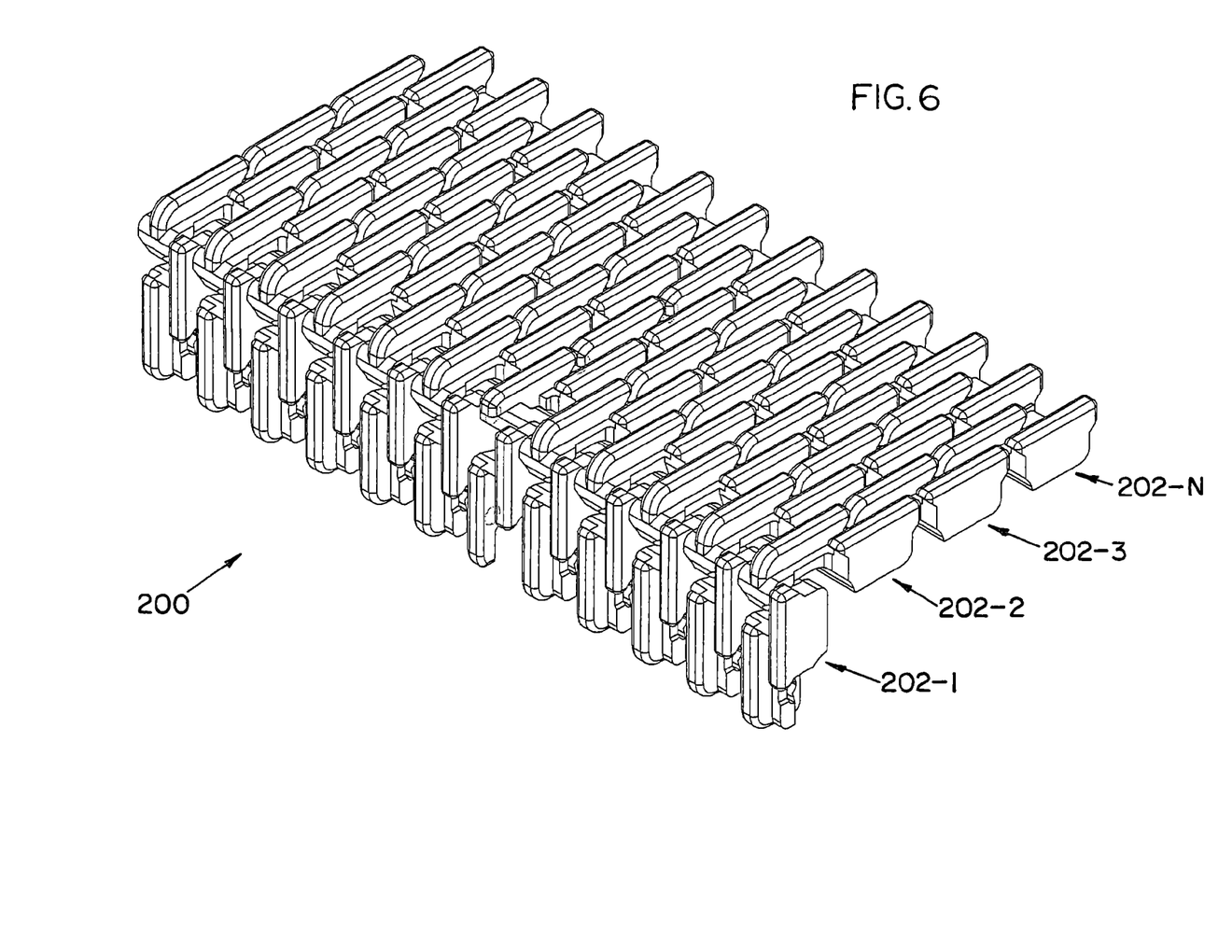
FIG. 6 is a front perspective view of a portion of a modular belt of another embodiment of the present invention.
Figures 7A, 7B:
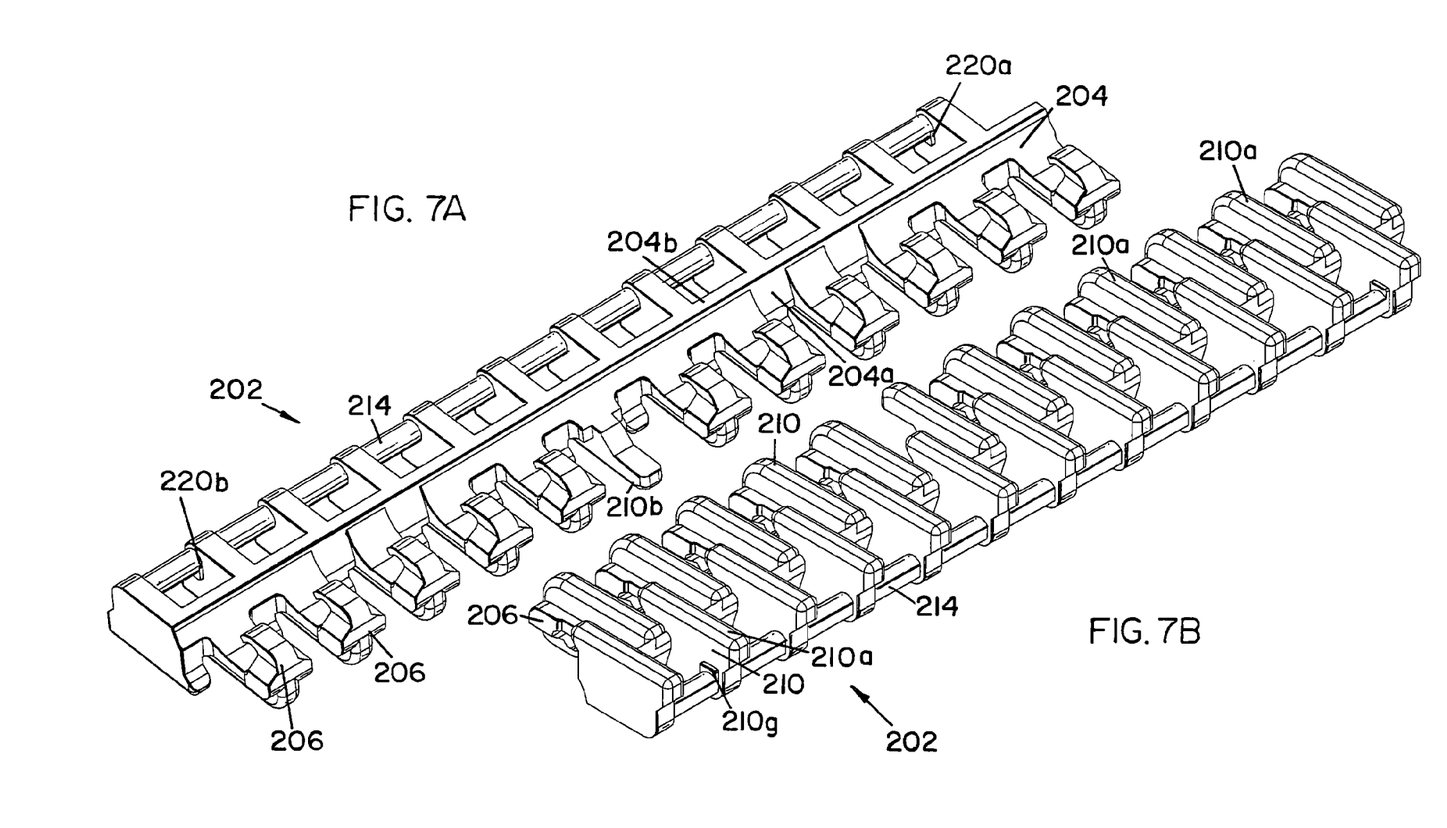
FIG. 7A is a bottom perspective view of a modular element of an embodiment of the present invention.
FIG. 7B is a top perspective view of the modular element of FIG. 7A.

Referring to FIG. 6, another embodiment of a modular belt 200 is illustrated. In particular, FIG. 6 illustrates a partial modular belt 200 made up of modular members 202-1 through 202-N. A plurality of the modular members 202-1 through 202-N would be connected together to form a conveyer belt. FIG. 7A illustrates a bottom view of a modular element generally designated as 202 and FIG. 7B illustrates a top view of the modular element 202. This embodiment also includes a main base 204 having a first side 204a and a second side 204b. Carrying segments 210 extend from the first side 102a and the second side 102b of the main base 204. The carrying segments 210 include an engaging surface 210a that is configured to engage products placed on the modular belt 200. Some of the carrying segments 210 that extend from the first side 204a of the main base 204 include hooks 206. In fact, in the embodiment of modular element 200 shown in FIG. 7A, each carrying segment 110, except carrying segment 110b that extends out from the first side 204a of the main base 204, includes a hook 206. The carrying segments 110 that extend out from the second side 204b of the main base 204 are all coupled to an attaching rod 214 in this embodiment. The hooks 206 of the modular member 202 are designed to engage the attaching rod 214 of another modular member 202 and so on to form the modular belt 200.

Figures 7C, 7D:
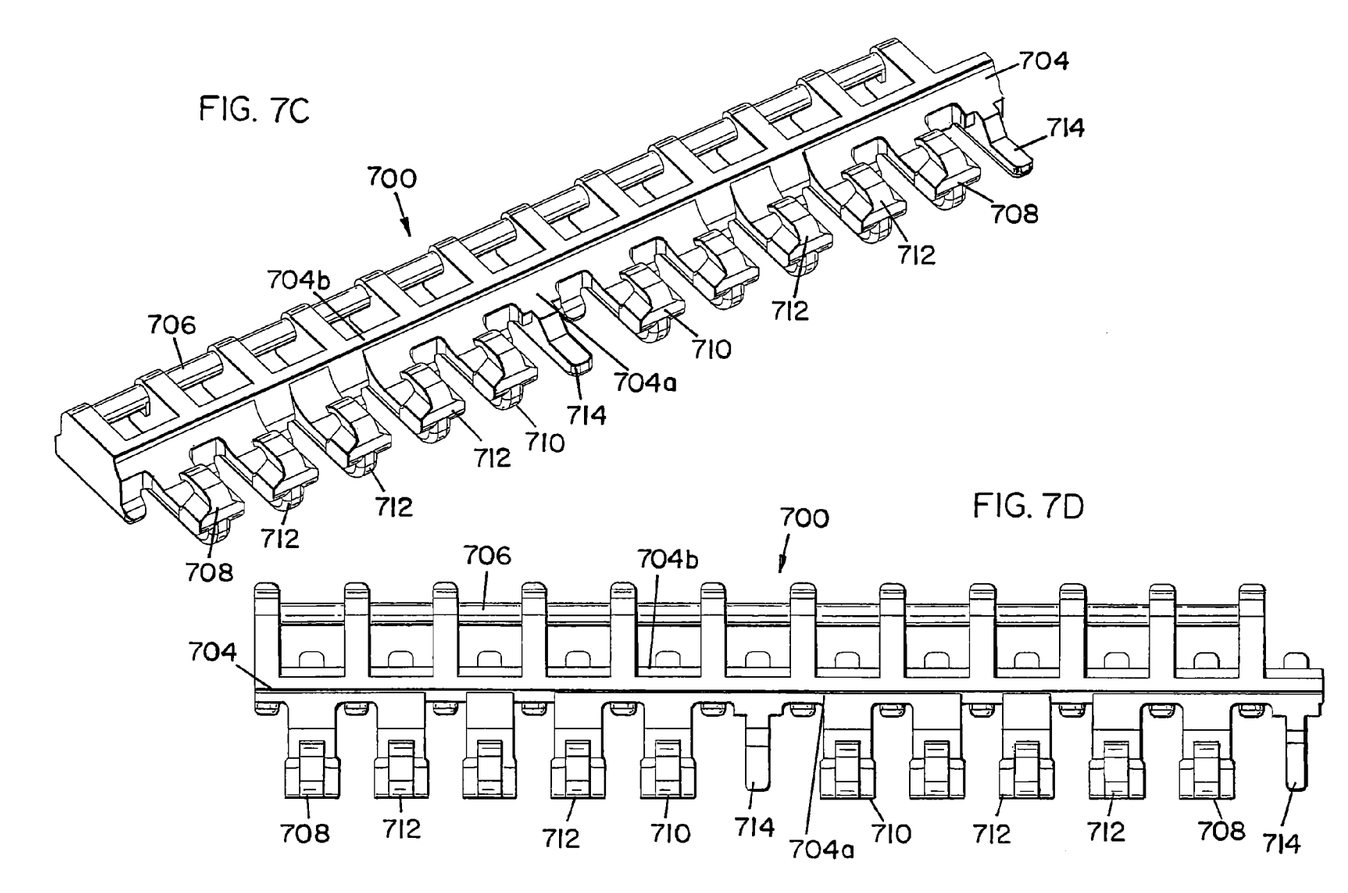
FIG. 7C is a bottom perspective view of another embodiment of a modular element of the present invention.
FIG. 7D is a bottom view of the modular element of FIG. 7C.
Figure 7E:
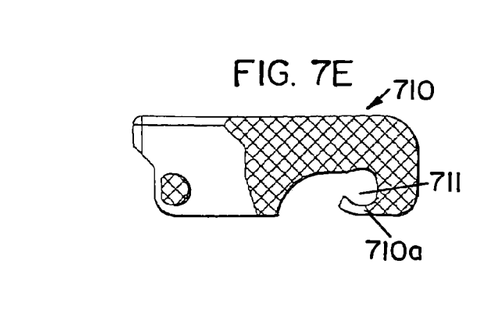
FIG. 7E is a cross-sectional side view of a portion of one hook of the modular element of FIG. 7C.
Figure 7F:
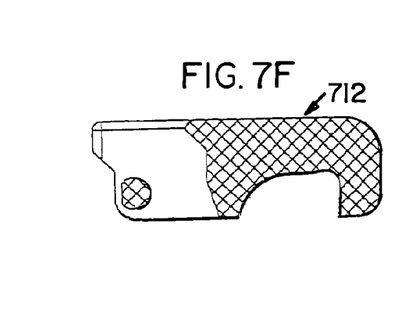
FIG. 7F is a cross-sectional side view of a portion of another hook of the modular element of the FIG. 7C.
Figure 7G:
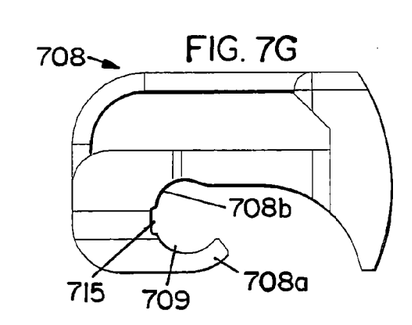
FIG. 7G is a side view of a portion of yet another hook of the modular element of the FIG. 7C.

In FIGS. 7C and 7D another embodiment of a modular element 700 is provided. In particular, in FIG. 7C a bottom perspective view of modular element 700 is illustrated and in FIG. 7D a bottom view of modular element 700 is illustrated. This embodiment of modular element 700 also includes a main base member 704 that has a first side 704a and a second side 704b. Hooks 708, 712 and 710 extend from the first side 704a of the base 704. A rod 706 is coupled proximate the second side 104b of the base 704. Carrying segments 714 without hooks are also illustrated. In particular, in this embodiment carrying segments 714 extending from the first side 704a proximate a mid point of the base 704 and proximate an end of the base 704 have no hooks. The hooks 708 712 and 710 have different configurations in this embodiment. In particular, a cross-sectional side view of a hook 710 is illustrated in FIG. 7E. As illustrated, each hook 710 includes arm portion 710a and a slot 711. FIG. 7F illustrates a cross-sectional side view of a hook 712. Each hook 712 does not have an arm section. Hence, access to an attaching rod of another modular element that is engaging hooks 712 by a cleaning solution is enhanced. In FIG. 7G a side view a hook 708 is illustrated. As illustrated hooks 708 include and arm 708a and a slot. Each hook 708 is also illustrated has having an interior surface 708a that forms the slot 709. The interior surface 708a includes a cutout section 715 similar to cutout section 130 discussed above.

Figure 8:
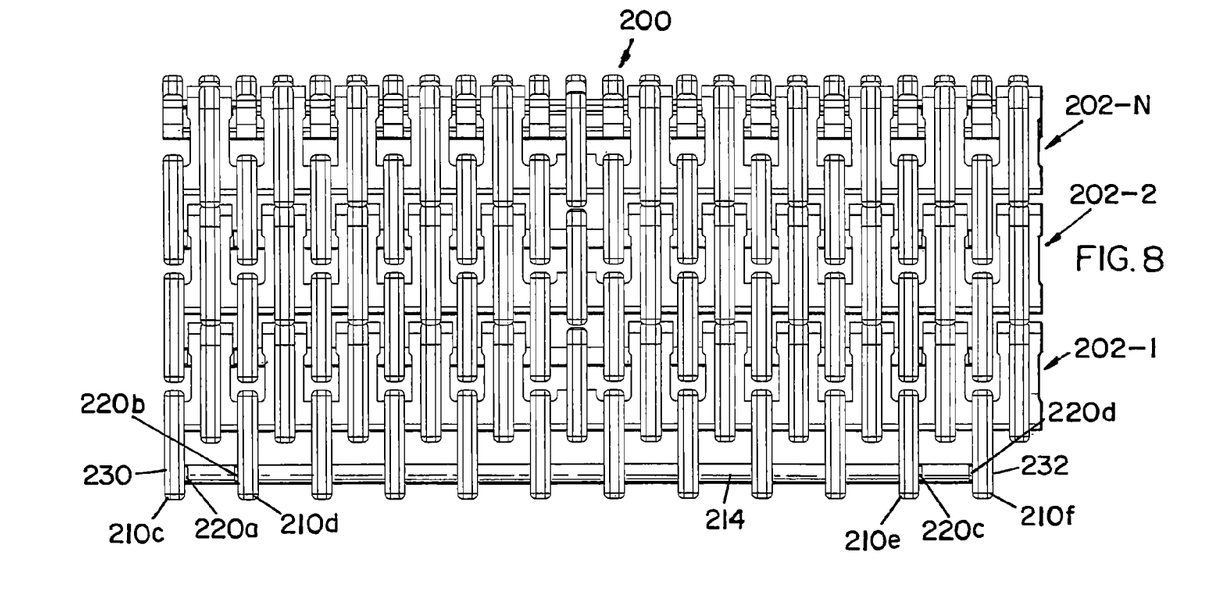
FIG. 8 is a top view of the portion of the modular belt of FIG. 6.

FIG. 8 illustrates a top view of the modular belt 200 implementing modular elements 202 shown in FIGS. 7A and 7B. Although, the modular belt 200 is illustrated as having a width defined by the width of sequentially coupled modular members 202-1 through 202-N, the modular members 202 can be positioned side by side and coupled together to form a modular belt of a select width. Moreover, the widths of each modular member 202 can be selected to achieve a desired width of the modular conveyer belt 200.

Figure 9:
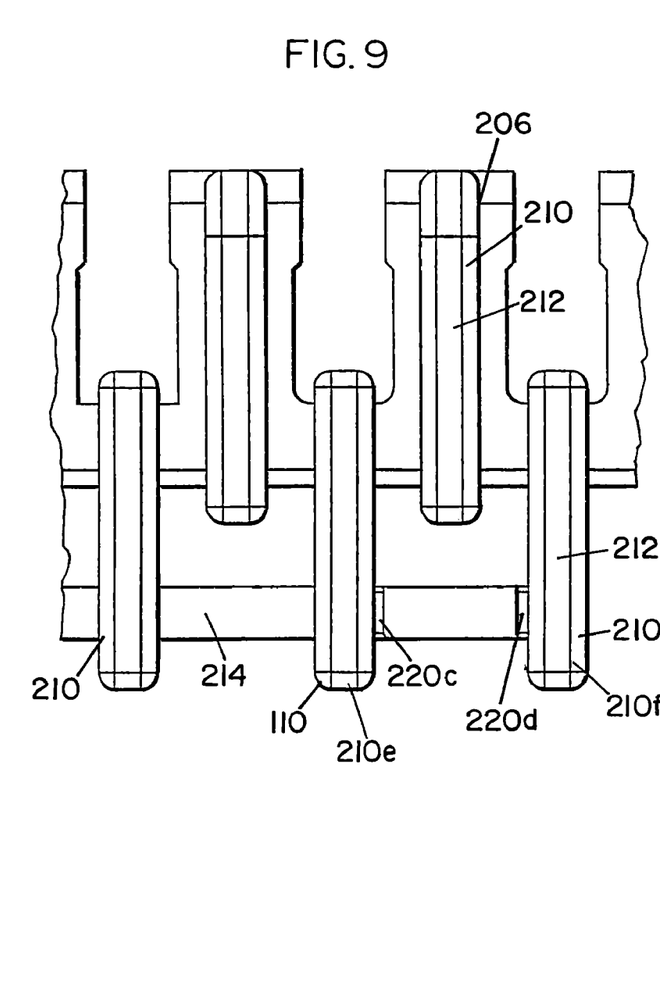
FIG. 9 is a close-up top view of a portion of a modular element of FIG. 7A.
Figure 10:
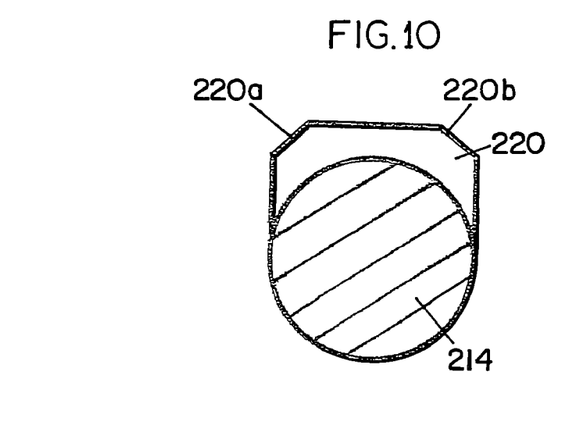
FIG. 10 is a cross sectional side view illustrating an attaching rod and a centering tab of one embodiment of the present invention.

Referring to modular member 202-1 of FIG. 8 another aspect of an embodiment is illustrated. In particular, modular member 202-1 is illustrated as having a first end 230 and a second end 232. Proximate the first end 230 is carrying segments 210c and 210d. Proximate the second end 232 is carrying segments 210e and 210f. The attaching rod 214 in this embodiment includes centering tab 220a proximate carrying segment 210c, centering tab 220b proximate carrying segment 210d, centering tab 220c proximate carrying segment 210e and centering tab 220d proximate carrying segment 210f. The centering tabs 220a, 220b, 220c and 220d keep hooks 206 from another coupled modular member 202 spaced away from surfaces 210g (illustrated in FIG. 7B) of the carrying segments 210 to enhance the cleaning of the modular belt 200. Referring to FIG. 9, a close up view of a section of a modular member 202 illustrating tabs 220c and 220d is illustrated. FIG. 10 further illustrates a cross-sectional view of an attaching rod 214 with a centering tab 220. As illustrated in this embodiment, the centering tab 220 only extends out from a portion of the attaching rod 214. This helps minimize the surface area that must be cleaned. The centering tab 220 in this embodiment includes a first angled face 220a and a second angled face 220b. The angled faces 220a and 220b help prevent corners of the centering tab 220 from catching on an attached hook 206. The angled faces 220a and 220b also help keep the belt from damaging product due to contact with sharp corners and help allow for a clean release of the product from the belt.

Figure 11:
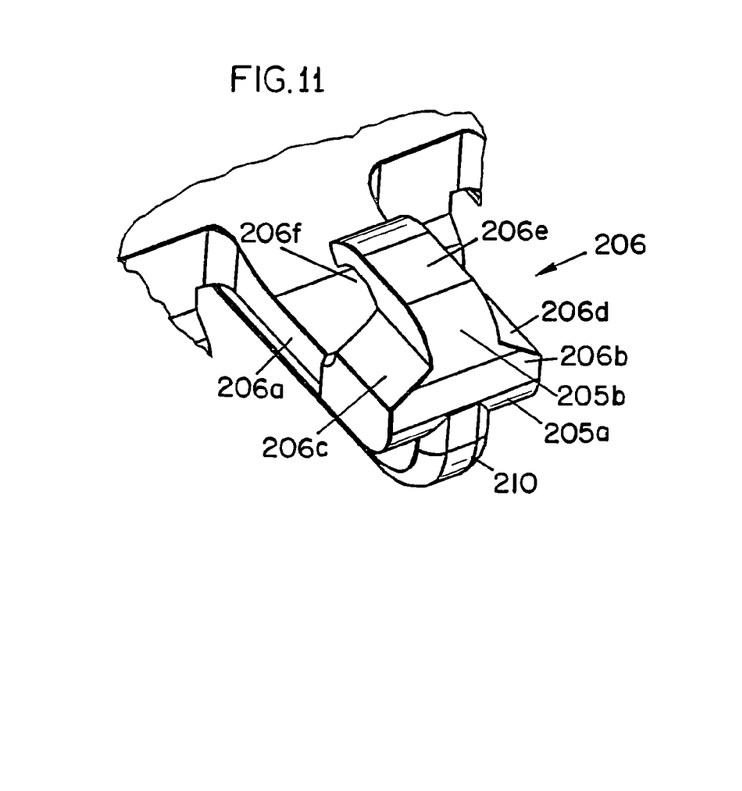
FIG. 11 is a bottom perspective view of a hook portion of a modular element of one embodiment of the present invention.
Figure 12:
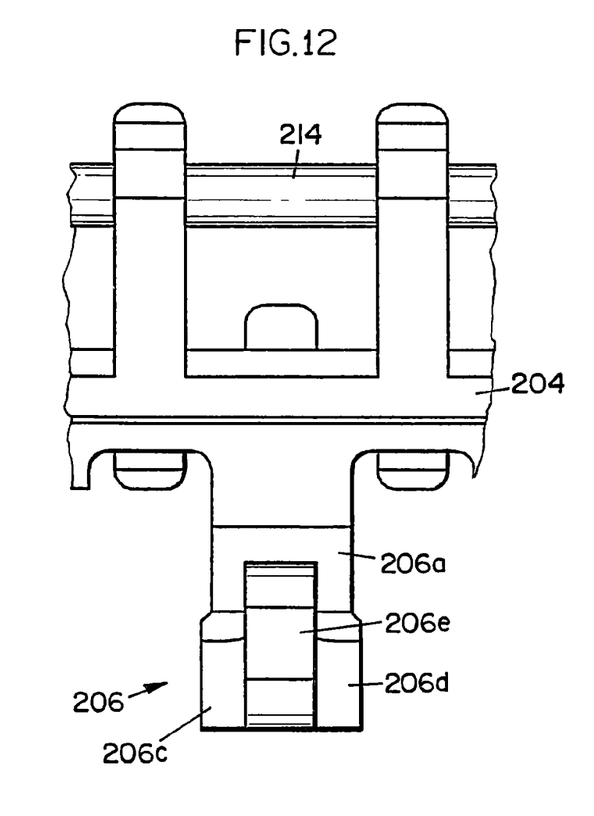
FIG. 12 is a bottom view of the hook portion of FIG. 11.

A close up view of a hook 206 of an embodiment of a modular member 202 is illustrated in FIGS. 11 and 12. The hook 206 in this embodiment includes a hook base 206a that extends along an edge of an associated carrying support 210. The hook base 206a has a select width. A reduction member 206b of the hook 206 has a first end 205a and a second end 205b. The first end 205a has a width that is approximately equal to the width of the hook base 206a. Moreover, the first end 205a of the reduction member 206b is coupled to the hook base 206a. The second end 205b of the reduction member 206b has a second width that is smaller than the first width. The reduction member 206b includes angled faces 206c and 206d that reduce the width of the reduction member 206b from the first end 205a to the second end 205b. A reduced hook arm 206e extends from the second end 205b of the reduction member 206b. The reduced arm 206e has a width that is generally equal to the width of the second end 205b of the reduction member 206b. Moreover, in the embodiment shown, the width of the reduced arm 206e is maintained at a select width throughout its length. As illustrated, the reduced arm 206e is positioned a select distance from the hook base 206a. The hook base 206a, the reduction member 206b, and the reduced arm 206e, form slot 206f that is designed to engage and hold an attaching rod of another modular member. In this embodiment, the reduced arm section 206d further allows for a better cleaning of the modular belt 200 because it provides better access to the attaching rod and nearby surfaces for a cleaning solution.

Figure 14A:
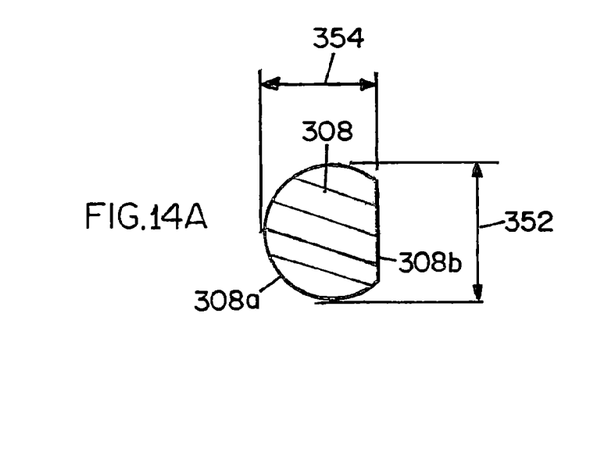
FIG. 14A is a cross-sectional side view of an attaching rod used in the embodiment of FIG. 13.
Figure 14B:
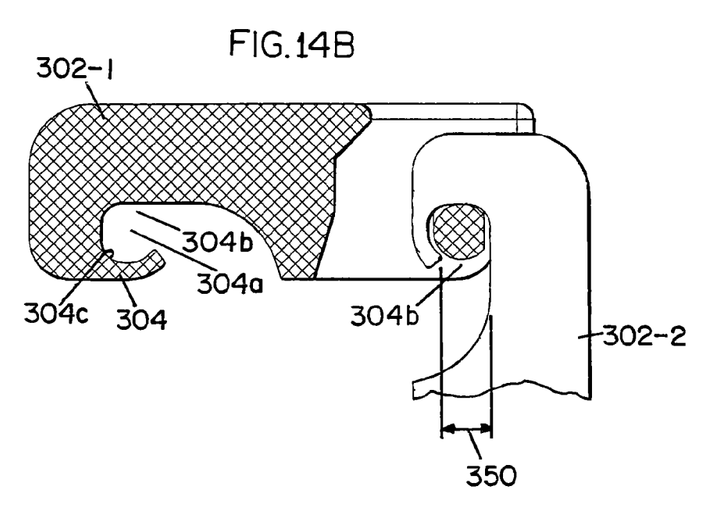
FIG. 14B is a cross-sectional side view of a portion of the modular members of FIG. 13 illustrating the insertion of the attaching rod in the hook of associated modular members.
Figure 14C:
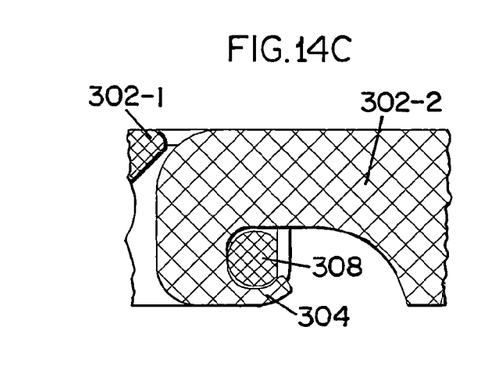
FIG. 14C is a cross-sectional side view of a portion of the modular members of FIG. 13.

As briefly discussed above, FIG. 13 illustrates a cross-sectional side view of attached modular members 302-1 through 302-N of another embodiment. As illustrated, each modular member 302-1 through 302-N includes a hook 304 and an attaching rod 308. The hook includes a slot 304a, an inner surface 304c and an opening 304b to the slot 304a. In this embodiment each modular members' 302 attaching rod 308 has a flat surface 308a along its length that aids in connecting modular members together. Referring to FIG. 14A, a close up cross-sectional view of an attaching rod 308 of this embodiment is illustrated. As illustrated, the attaching rod 308 has a generally rounded portion 308 and a flat face 308. The flat portion 308 is a flat face that extends a length of the attaching rod 308. The attaching rod 308 has a first diameter 352 and a second diameter 354 that is less than the first diameter 352 as the result of the flat face 308. In particular, the distance of the first diameter 352 that includes a section of the attaching rod 308 with the flat face 308 is less than the distance of the second diameter 352 that does not include a section of the attaching rod 308 with the flat face 308. FIG. 14B illustrates a cross-sectional view of two modular elements 302-1 and 302-2 being coupled together. As illustrated, the attaching rod 308 of the first modular member 302-1 is positioned in the slot 304a of the hook 304 of the second modular member 302-2. The opening 304b of the hook 304 of the second modular member 302-2 has a select opening distance 350. The select opening distance 350 is slightly less than the second diameter 354 of the attaching rod 308 to allow a press fit of the attaching rod 308 into the slot 304a. For example, an opening distance 350 that is 0.015 inches less than the second diameter 354 of the attaching rod 308 could be used. This allows for the attaching rod 308 of the second modular member 302-2 to be easily inserted into the slot 304a of the hook 304 of the first modular member 302-1. In particular, as FIG. 14B illustrates, when the second modular member 302-2 is positioned perpendicular to the first modular member 302-1, attaching rod 308 press fits through the opening 304b of the hook 304 since the second diameter 354 of the attaching rod 308 is slightly more than the distance 350 of the opening 304b. Once, the attaching rod 308 of the second modular member 302-2 is in the slot 304a of the hook 304 of the first modular member 302-1, the first and second modular members 302-1 and 302-2 are rotated in relation to each other to lock the attaching rod 308 of the second modular member 302-2 in the slot 304a of the first modular member 302-1 as illustrated in FIG. 14C. Hence, when rotated, the second diameter 354 of the attaching rod 308 being relatively larger than the opening 304b of the hook 304 locks the modular members 302-1 and 302-2 together.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A modular member for a conveyer belt, the modular member comprising:
    an elongated main base having a first side and second side opposite the first side;
    at least one attaching rod coupled proximate a first side of the main base; and
    a plurality of aligned hooks coupled proximate the second side of the main base, each hook including a slot defined by an inner surface, the slot of each hook configured to receive an attaching rod of another modular member, the inner surface that defines the slot of at least one hook having an attaching rod relief cutout section, wherein the attaching rod relief cutout section limits wear between the attaching rod of another modular member that is received in the slot of the at least one hook and the inner surface of the slot of the at least one hook.

2. The modular member of claim 1, further comprising:
    at least one carrying segment coupled to the elongated base member configured to engage product placed on the belt.

3. The modular member of claim 2, wherein the at least one carrying segment further comprises:
    a first set of carrying segments extending from the first side of the elongated main base, the at least one attaching rod coupled to at least some of the carrying segments in the second set of carrying segments; and
    a second set of carrying segments extending from the second side of the elongated main base, each hook coupled to an associated carrying segment from the first set of carrying segments.

4. The modular member of claim 3, wherein not all of the carrying segments of the first set of carrying segments have an associated hook coupled thereto.

5. The modular member of claim 1, wherein the plurality of hooks include a pair of outer hooks and inner hooks positioned between the outer hooks, the outer hooks having the attaching rod relief cutout sections.

6. The modular member of claim 3, each carrying segment of each first and second sets of carrying segments further having a first edge, a second edge opposite the first edge, a first end and second end opposite the first end, the first edge having an engaging surface configured to support a product, the first edge of the carrying segment coupled to the main base proximate the first end of the carrying segment.

7. The modular member of claim 6, wherein at least one hook further comprises:
    a hook base extending along the length of the second edge of an associated carrying segment, the hook base having a select width;
    a reduced arm section positioned to extend substantially parallel to at least a portion of the hook base at a select distance from the hook base, a width of the reduced arm section less than the width of the select width of the hook base; and
    a reduction member having first and second angled faces extending between the hook base and the reduced arm section proximate the second end of the carrying segment, wherein the hook base, reduced arm section and the reduction member form the slot of the at least one hook.

8. The modular member of claim 7, wherein the width of the reduced arm section is constant throughout its length.

9. The modular member of claim 1, wherein the at least one attaching rod has a first diameter across a first width of the attaching rod and a second diameter across a second width.

10. A modular member for a modular belt, the modular member comprising:
    an elongated main base member having a first side and a second side;
    a first set of carrying segments extending from the first side of the main base member, each carrying member of the first set having a first side, a second side opposite the first side, a first edge and a second edge opposite the first edge, the first edge of each carrying segment having an engaging surface configured to support a product;
    a plurality of hooks, each hook including,
        a hook base coupled to the second edge of an associated carrying segment, the hook base having a select width,
        a reduced arm positioned a select distance from the hook base and extending along a select length of the hook base, the reduced arm having a relatively uniform width that is less than the width of the hook base, and
        a reduction member extending between the hook base and the reduced arm proximate the second side of the associated carrying segment, the hook base, the reduced and the reduction member forming a slot; and
    a second set of carrying segments, each carrying member of the second set having a first side, a second side opposite the first side, a first edge and a second edge opposite the first edge, each carrying member extending from the second side of the main base member proximate the first side of the carrying member, the first edge of each carrying segment having an engaging surface configured to support a product;
    at least one attaching rod, the at least one attaching member coupled to associated carrying segments from the second set, the attaching rod coupled proximate the second side of the respective carrying member, the at least one attaching rod configured to be received in a slot of another modular member; and
    at least two centering tabs positioned proximate the at least one attaching rod and associated carrying segments in the second set, the centering tabs configured to space hooks of another modular member coupled to the at least one attaching rod from the associated carrying segments of the second set.

11. The modular member of claim 10, wherein the reduced arm has a first end extending from the reduction member and a second end, the second end of the reduced arm forming an opening with the hook base to the slot of the hook.

12. The modular member of claim 11, wherein the at least one attaching rod has a flat surface about its length so that the attaching rod has a first cross-sectional width about a first section that includes the flat surface that is less than a cross-sectional width about a second section that does not include the flat section, the width of the first section being slightly more than an opening distance to a slot of a hook of another modular member and the width of the second section being more than the opening distance of the hook of the other modular member.

13. The modular member of claim 10, wherein at least one of the center tabs extends from the at least one attaching rod toward the engaging surface of an associated carrying segment of the second set of carrying segments.

14. The modular member of claim 10, wherein the slots of at least one hook includes an inner surface configured to engage an attaching rod of another modular member, the inner surface of the at least one hook having an attaching rod relief cutaway section configured to limit wear on the inner surface of the at least one hook and the attaching rod of the another modular member when in use.

15. The modular member of claim 10, wherein at least one of the carrying segments in the first set of carrying segments does not have a hook coupled thereon.

16. The modular member of claim 10, wherein the at least one of carrying segments in the second set of the carrying segments is not coupled to the at least one attaching rod.

17. A modular conveyer belt comprising:
  a plurality of modular members selectively coupled together, each modular member including,
    an elongated main base having a first side and second side opposite the first side,
    a first set of carrying segments extending from the first side of the elongated main base,
    a second set of carrying segments extending from the second side of the elongated member,
    at least one attaching rod coupled to at least some of the carrying segments in the second set of carrying segments,
    a plurality of hooks, each hook coupled to an associated carrying segment from the first set of carrying segments, each hook including a slot defined by an inner surface, the slot of each hook configured to receive an attaching rod of another modular member, the inner surface that defines the slot of at least two hooks having an attaching rod relief cutout section, wherein the attaching rod relief cutout section limits wear between an attaching rod received in the slot of the at least one hook and an inner surface of the slot of the at least one hook, and
    at least two centering tabs for each attaching rod, each centering tab configured to space hooks of another modular member from associated carrying segments in the second set of carrying segments of the another modular member.

18. The modular conveyer belt of claim 17, wherein the plurality of hooks include at least one pair of outer hooks and at least one inner hook, an associated at least one inner hook positioned between the at least one pair of outer hooks, the at least one pair of outer hooks having the attaching rod relief cutout sections.

19. The modular conveyer belt of claim 17, wherein each hook further comprises:
  a hook base coupled along an edge of an associated carrying segment in the second set of carrying segments, the hook base having a select width;
  a reduction member having a first end having a first width and a second end having a second width, the first width proximately equal to the width of the hook base, the first end of the reduction member coupled to the hook base; and
  a reduced arm extending from the second end of the reduction member, the reduced arm having a width proximately equal to the second width of the reduction member and a select length, the width of the reduced arm being constant throughout its length, the reduced arm, the reduction member and the hook base forming the slot of the hook.

20. The modular conveyer belt of claim 19, wherein the at least one attaching rod has a flat face along its length.

21. The modular conveyer belt of claim 19, wherein a cross-sectional width of the attaching rod along a first section that includes the flat face has a width that is slightly larger than a width to an opening to the slot of a modular member, further wherein the cross-sectional width of the attaching rod along a second section that does not include the flat face has a width that is larger than the width along the first section, wherein width along the first section allows a press fit to pass the attaching rod through the opening into the slot and the width along the second section retains the rod in the slot.

22. The modular conveyer belt of claim 19, wherein each centering tab is positioned adjacent a side face of an associated carrying segment in the second set of carrying segment and between the at least one attaching rod and an engaging surface of the associated carrying segment.

* * * * *